(12) United States Patent
Hata et al.

(10) Patent No.: US 9,763,468 B2
(45) Date of Patent: Sep. 19, 2017

(54) FUNCTIONAL CONTINUOUS RAPID FREEZING APPARATUS

(71) Applicant: JAPAN SCIENCE & TECHNOLOGY TRADING CO., LIMITED, Hong Kong (CN)

(72) Inventors: Tadayo Hata, Osaka (JP); Shinsuke Maeda, Yokohama (JP); Toshiyuki Maruoka, Toyonaka (JP)

(73) Assignee: JAPAN SCIENCE & TECHNOLOGY TRADING CO., LMITED, Hong Kong (CN)

( * ) Notice: Subject to any disclaimer, the term of this patent is extended or adjusted under 35 U.S.C. 154(b) by 211 days.

(21) Appl. No.: 14/429,613

(22) PCT Filed: Sep. 26, 2012

(86) PCT No.: PCT/JP2012/074700
§ 371 (c)(1),
(2) Date: Mar. 19, 2015

(87) PCT Pub. No.: WO2014/049717
PCT Pub. Date: Apr. 3, 2014

(65) Prior Publication Data
US 2015/0250225 A1 Sep. 10, 2015

(51) Int. Cl.
*F25D 17/04* (2006.01)
*A23L 3/36* (2006.01)
*F25D 17/06* (2006.01)

(52) U.S. Cl.
CPC .............. *A23L 3/364* (2013.01); *F25D 17/06* (2013.01); *F25D 2317/0684* (2013.01); *F25D 2400/30* (2013.01)

(58) Field of Classification Search
CPC .... F25C 5/005; F25C 2400/10; F25D 17/065; F25D 3/08
USPC ............ 62/340, 344, 371, 407, 457.5, 457.9
See application file for complete search history.

(56) References Cited

U.S. PATENT DOCUMENTS

| | | | | |
|---|---|---|---|---|
| 2,210,946 A * | 8/1940 | Moore | ................... | B65D 81/18 106/137.2 |
| 3,217,506 A * | 11/1965 | Beck | ......................... | F25C 1/04 62/137 |
| 5,406,805 A * | 4/1995 | Radermacher | ........ | F25D 11/022 62/113 |
| 6,532,749 B2 * | 3/2003 | Rudick | ..................... | F25B 9/14 62/239 |

(Continued)

*Primary Examiner* — Melvin Jones
(74) *Attorney, Agent, or Firm* — Kratz, Quintos & Hanson, LLP

(57) ABSTRACT

To provide a functional continuous rapid freezing apparatus with which cold air is made uniformly contact with the whole face of an article to be frozen, easily and rapidly passing the maximum ice crystal generating zone, and the central portion of the article to be frozen can reach for the predetermined temperature within a short period of time, a freezing chamber 2 in which an article Q to be frozen is stored, a heat exchanger 1 for cooling disposed on a central portion of the freezing chamber 2 as a partition to divide the freezing chamber 2 into a first freezing block 2a and a second freezing block 2b, a first blowing fan 5 disposed to face the heat exchanger 1 for cooling through the first freezing block 2a, and a second blowing fan 6 disposed to face the heat exchanger 1 for cooling through the second freezing block 2b, are provided.

1 Claim, 8 Drawing Sheets

(56) References Cited

U.S. PATENT DOCUMENTS 7,188,489 B2 * 3/2007 Martello ............... B60H 1/005
                                                                            62/420
2002/0162337 A1 * 11/2002 Peters ..................... G01N 1/42
                                                                            62/3.2

* cited by examiner

FUNCTIONAL CONTINUOUS RAPID FREEZING APPARATUS

FIELD OF THE INVENTION

This invention relates to a functional continuous rapid freezing apparatus with which articles to be frozen such as various foods and foodstuffs can be frozen continuously for a long period of time with high quality and low cost.

BACKGROUND ART

Various food preservation methods, starting with traditional salting and drying from ancient times, such as canning, retort, vacuum packing, low-temperature preservation, freezing, etc. have been made in the process of technological progression with change of the ages.

The important point of them is how to prevent rot by microbes and degeneration by chemical reaction. Especially, freezing method (freezing apparatus), currently in mainstream and developed to aim at preservation of fresh foods with original state (color, taste, flavor, feel, etc.), and long-term preservation of the state just after the production of processed foods, is deeply permeating into our eating habits not only in general households but restaurant industry.

Rapid freezing technology exists on the top of them. Different from simple slow freezing, for example, an air blast system to freeze articles (food or foodstuff) to be frozen by blowing cold air of very low temperature of −35° C. to −55° C., a brine system in which articles are made contact with liquid cooling media, and a compound system of the both (refer to patent document 1, for example).

PRIOR ART DOCUMENT

Patent Document

Patent document 1: Japanese Patent Provisional Publication NO. 2011-78333.

OUTLINE OF THE INVENTION

Problems to be Solved by the Invention

Especially, in the conventional air blast system, although the freezing is rapid, a certain duration of time is necessary to completely freeze a thick article because the air can't contact the whole face of the article to be frozen, freezing progresses firstly from a partial contact face to the cold air and heat conduct gradually progresses (freezing progresses) into inner portions. Therefore, water in tissue cells of the article becomes ice (crystal) and grows in a maximum ice crystal generating zone (approximately −1° C. to −5° C.), broken tissue cells flows out as drips when thawed, and this causes quality degeneration.

Especially, in case that the articles to be frozen are composed of small amount and many kinds, freezing irregularity is frequently generated for differences of configurations of the articles.

And, vapor in the freezing chamber and water of the articles concentrate, become frost, and stick to a heat exchanger for cooling, and failure is caused by decreasing the freezing ability and overload on a compressor.

And, removal (defrosting) of the frost on the heat exchanger for cooling has to be conducted for every predetermined time (around every 8 hours), continuous operation (24-hour operation) is impossible, freezing time tends to be set long to eliminate the freezing irregularity, freezing efficiency is low, and production cost becomes high.

For example, a conventional freezing apparatus of air blast system as shown in FIG. 8 is provided with a freezing chamber 92 in which an article Q such as food, foodstuff, etc. to be frozen, a heat exchanger for cooling 91 disposed on an inner wall side of the freezing chamber 92 to generate cold air, and blowing fans 95 to blow the cold air to the article Q to be frozen.

And, the cold air is flowing by the blowing fans 95 always in same direction to the article Q to be frozen and circulated within the freezing chamber 92 in similar manner to natural convection. The article Q is cooled from one face in direct contact with the cold air, another face is cooled insufficiently, and a certain period of time is necessary to make the central portion reach for a predetermined temperature by heat conduct.

And, in case that the disposition, configuration, and size of the articles are different, the flowing of the cold air is hindered and disturbed, and the cold air may not contact some articles at all.

These facts are biggest causes of the above-described problems of freezing irregularity and quality degeneration. That is to say, the rapid freezing apparatus is regrettably a sub-rapid freezing apparatus.

Therefore, for keeping the quality of various articles to be frozen, needless to mention rapid passing of the maximum ice crystal generating zone, it is important to freeze the article to the central portion rapidly after the passing, decrease physical damage to the minimum, and freeze the article with the predetermined temperature with low cost and without freezing irregularity.

Therefore, it is an object of the present invention to provide a functional continuous rapid freezing apparatus with which cold air is made uniformly contact with the whole face of an article to be frozen, easily and rapidly passing the maximum ice crystal generating zone, and the central portion of the article to be frozen can reach for the predetermined temperature within a short period of time.

Means for Solving the Problems

To achieve the object above, a functional continuous rapid freezing apparatus of the present invention is provided with a freezing chamber in which an article to be frozen is stored, a heat exchanger for cooling disposed on a central portion of the freezing chamber as a partition to divide the freezing chamber into a first freezing block and a second freezing block, a first blowing fan disposed to face the heat exchanger for cooling through the first freezing block, and a second blowing fan disposed to face the heat exchanger for cooling through the second freezing block.

And, a fan controlling portion, which controls fan rotating directions of the first blowing fan and the second blowing fan as to switch cold air in the freezing chamber generated by the heat exchanger for cooling to a flowing from the first freezing block to the second freezing block and to a flowing from the second freezing block to the first freezing block for a predetermined time, is provided.

Effects of the Invention

According to the present invention, cold air flows uniformly on the whole face of the article to be frozen as to wrap the article, passing the maximum ice crystal generating zone within a short period of time, the central portion of the article to be frozen reaches for the predetermined temperature within a short period of time, and ideal rapid freezing can be conducted. Frozen processed articles of various foods and foodstuffs can be continuously operated for a long time with high quality and low cost. Quality degeneration by freezing can be reduced to the minimum.

And, frozen food (freezing processed article) is highly convenient, and taking root in current eating habits. Although thawed fish are sold in supermarkets at relatively low prices, they are often criticized as thawed articles. However, when people can taste fresh fish, meat, vegetables anywhere in the world, or can taste best-quality articles anytime in any season, this contributes to daily pleasure not only for gourmands, but for general people, further for elderly people living in nursing homes, and greatly contributes to rich eating habits of the people of the world.

EMBODIMENTS OF THE INVENTION

Figure 1:
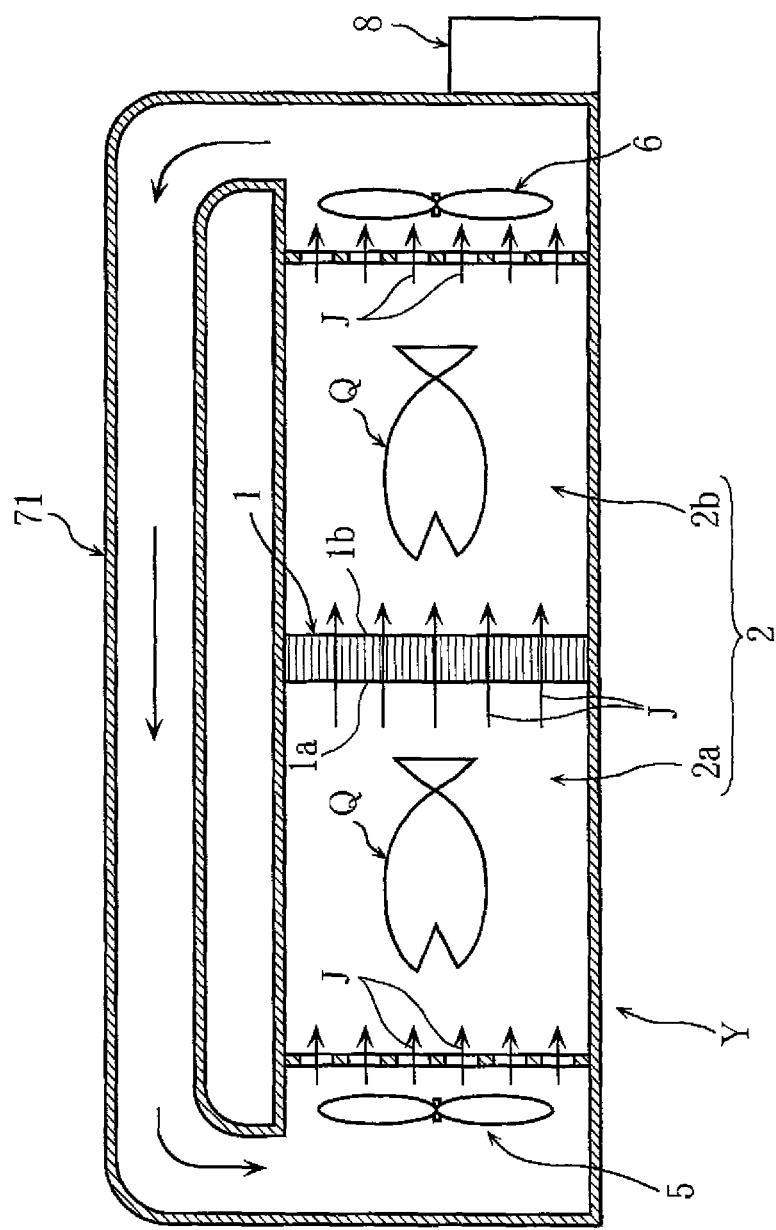
FIG. 1 A simplified cross-sectional front view showing an embodiment of a functional continuous rapid freezing apparatus relating to the present invention.

The present invention will now be described according to the embodiments shown in the drawings.

Figure 2:
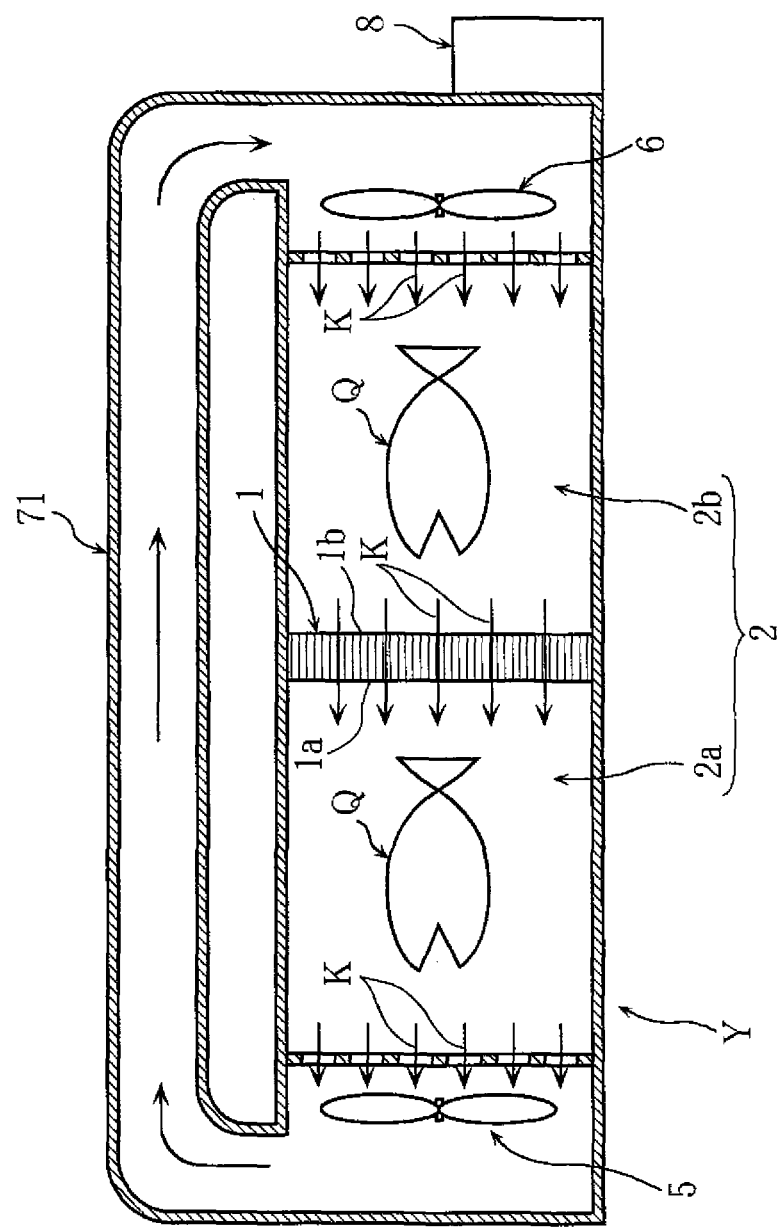
FIG. 2 A simplified cross-sectional front view to explain functions.

The functional continuous rapid freezing apparatus relating to the present invention is, as shown in FIG. 1 and FIG. 2, provided with a freezing chamber 2 in which an article Q to be frozen is stored, and a heat exchanger 1 for cooling (cooling medium vaporizer) disposed on a central portion of the freezing chamber 2 as a partition.

The freezing chamber 2 is divided into a first freezing block 2a and a second freezing block 2b by the heat exchanger 1 for cooling (also called the cooler 1 below in some cases).

The cooler 1 generates cold air by cooling the surrounding air, and cooling medium such as cooling gas is circulating inside.

And, with the configuration of the cooler 1, the air (cold air) can be sent from one face 1a side to another face 1b side, and from the face 1b side to the face 1a side of the cooler 1. For example, cooling medium pipes of a meandering configuration and ladder configuration, or a block configuration having plural heat emission fins, cooling medium ducts, and through holes for cold air. That is to say, the configuration is freely set as long as the cold air can pass through.

And, a first blowing fan 5 disposed to face the face 1a of the cooler 1 through the first freezing block 2a on (near) one of left and right inner walls of the freezing chamber 2, and a second blowing fan 6 disposed to face the other face 1b of cooler 1 through the second freezing block 2b on (near) another of the left and right inner walls of the freezing chamber 2, are provided. The first and second blowing fans 5 and 6 can change blowing directions (a blowing direction and a sucking direction) by normal and reverse rotational operation of the fan rotational directions.

That is to say, the embodiment of FIG. 1 and FIG. 2 is provided with the cooler 1, the freezing chamber 2 in which the cooler 1 is disposed on the central portion to form the first freezing block 2a and the second freezing block 2b, and a freezing unit Y having the first and second blowing fans 5 and 6.

And, a fan controlling portion 8, which can conduct on-off control of the first and second blowing fans 5 and 6, normal-reverse rotational control of the fan rotational directions, and wind speed (rotational pitch) control of the fan, etc., is provided. The fan controlling portion 8 is a computer, etc. provided with a calculation processing means such as a CPU and a memory means (hard disc, flash memory, RAM, ROM, etc.).

The fan controlling portion 8 conducts cold air flowing reverse control (fan reverse control) which controls fan rotating directions of the first blowing fan 5 and the second blowing fan 6 as to switch the cold air (the air in the freezing chamber 2) to a flowing from the first freezing block 2a to the second freezing block 2b through the cooler 1 as shown with arrows J in FIG. 1 and to a flowing from the second freezing block 2b to the first freezing block 2a through the cooler 1 as shown with arrows K in FIG. 2. And, the fan controlling portion 8 conducts the cold air flowing reverse control for every predetermined time.

And, the freezing unit Y has a return duct 71 to connect (joint) the opposite side to the freezing block of the first blowing fan 5 and the opposite side to the freezing block of the second blowing fan 6.

The return duct 71 is a cold air circulation duct which sends the cold air blown out by the second blowing fan 6 when the first and second blowing fans 5 and 6 generate the cold air flow in the arrows J direction in FIG. 1, the cold air blown out by the first blowing fan 5 when the first and second blowing fans 5 and 6 generate the cold air flow in the arrows K direction in FIG. 2.

Figure 3:
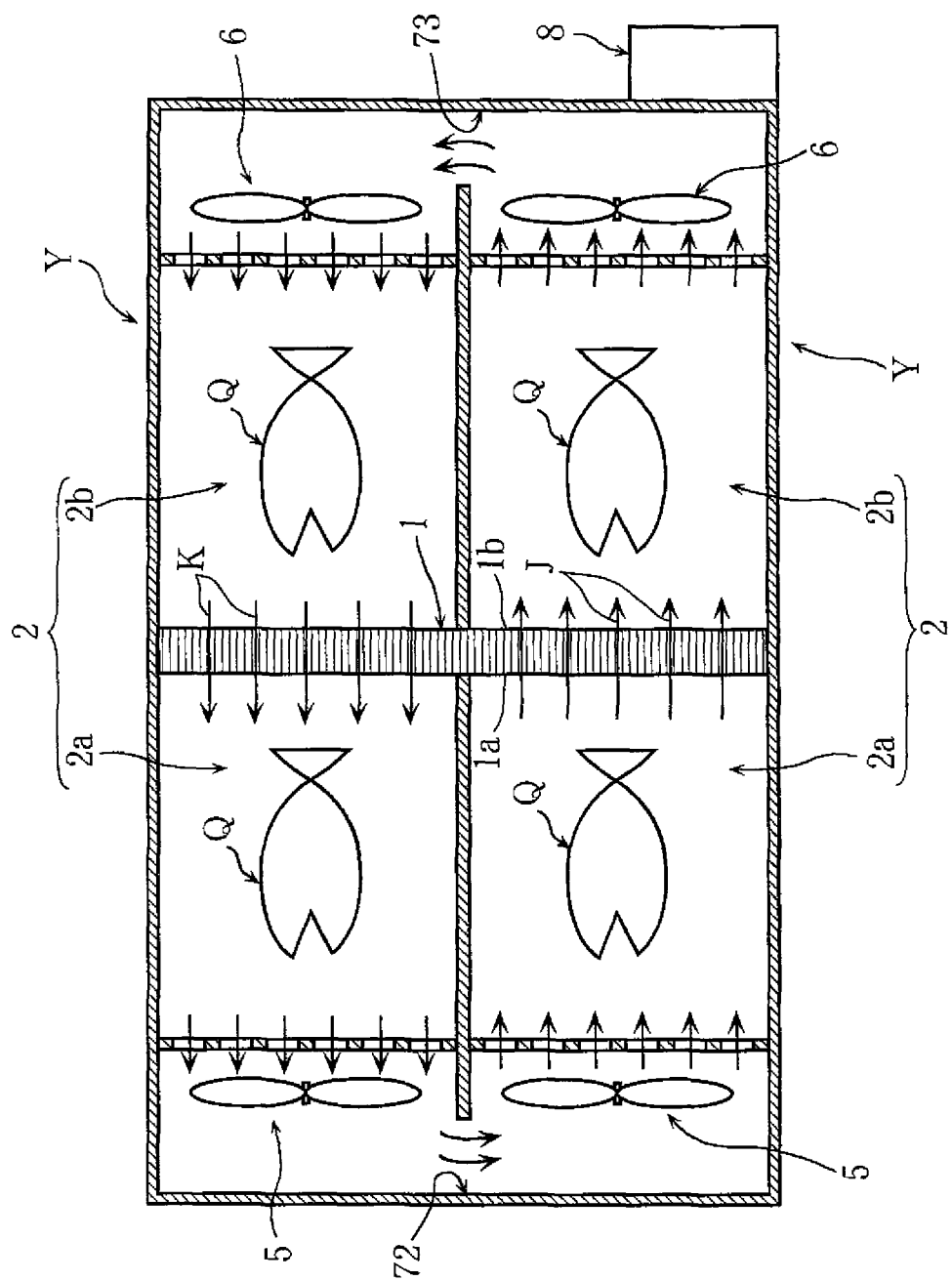
FIG. 3 A simplified cross-sectional front view showing another embodiment.
Figure 4:
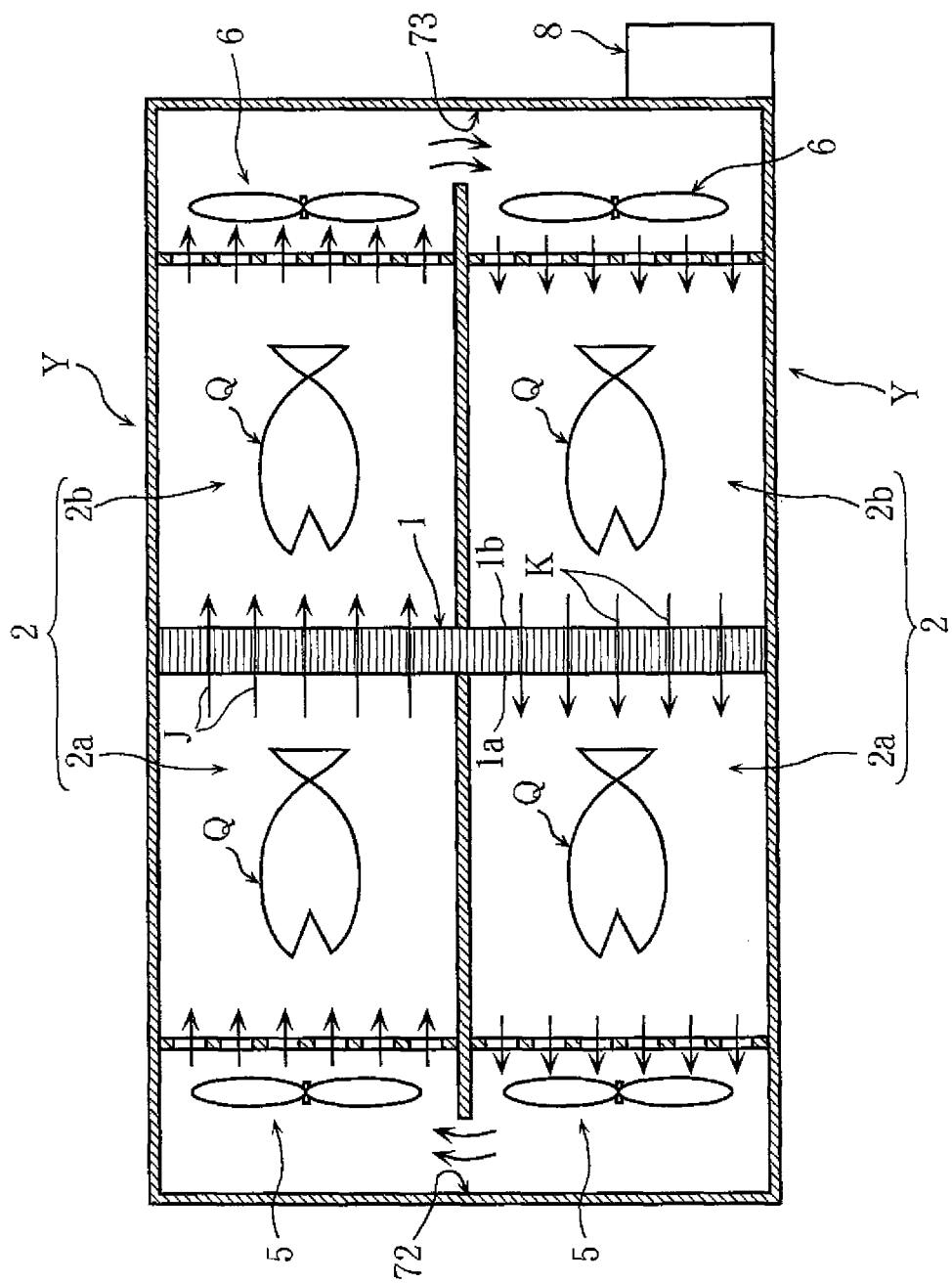
FIG. 4 A simplified cross-sectional front view to explain functions of the other embodiment.
Figure 5:
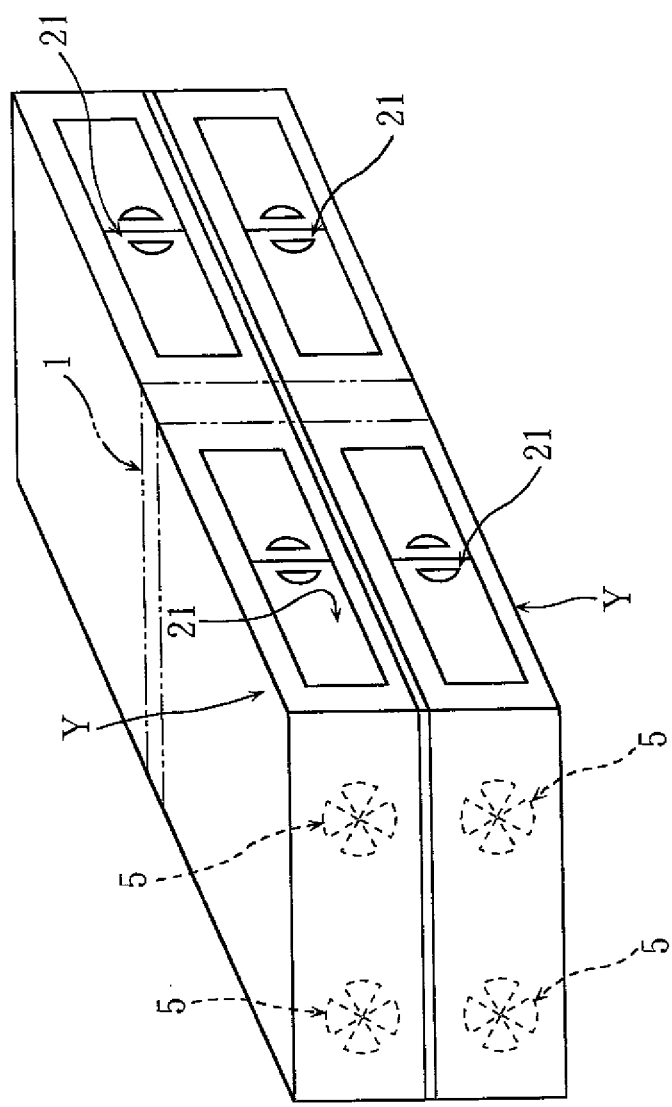
FIG. 5 A perspective view of the other embodiment.

Next, in another embodiment shown in FIGS. 3 through 5, two above-described freezing units Y are disposed parallel as to neighbor in an upper-lower direction. That is to say, one of the upper-lower freezing units Y and another of the upper-lower freezing units Y are provided.

In FIG. 3 and FIG. 4, a first communicative duct 72 is provided to connect the opposite side to the freezing block of the first blowing fan 5 of one of the upper-lower freezing units Y and the opposite side to the freezing block of the first blowing fan 5 of the other of the upper-lower freezing units Y. And, a second communicative duct 73 is provided to connect the opposite side to the freezing block of the second blowing fan 6 of one of the upper-lower freezing units Y and the opposite side to the freezing block of the second blowing fan 6 of the other of the upper-lower freezing units Y. The first communicative duct 72 and the second communicative duct 73 are cold air circulation ducts.

And, one of the upper-lower freezing units Y and the other of the upper-lower freezing units Y are sharing one cooler 1.

As shown in FIG. 3, the fan controlling portion 8 conducts first circulating cold air generation control which controls fan rotating directions of the first blowing fan 5 and the second blowing fan 6 as to flow the cold air in the arrows J direction in one of the upper-lower freezing units Y (as to flow the cold air from the first freezing block 2a to the second freezing block 2b through the cooler 1), and as to flow the cold air in the arrows K direction in the other of the upper-lower freezing units Y (as to flow the cold air from the second freezing block 2b to the first freezing block 2a through the cooler 1).

And, as shown in FIG. 4, the fan controlling portion 8 conducts second circulating cold air generation control which controls fan rotating directions of the first blowing fan 5 and the second blowing fan 6 as to flow the cold air in the arrows K direction in one of the upper-lower freezing units Y (as to flow the cold air from the second freezing block 2b to the first freezing block 2a through the cooler 1), and as to flow the cold air in the arrows J direction in the other of the upper-lower freezing units Y (as to flow the cold air from the first freezing block 2a to the second freezing block 2b through the cooler 1). That is to say, the second circulating cold air generation control is conducted to generate cold air flow in the reverse (circulating) direction to the first circulating cold air generation control.

And, the fan controlling portion 8 conducts the cold air flowing reverse control, which controls the fan rotational directions as to switch the above-described first circulating cold air generation control and the above-described second circulating cold air generation control (in turn) for every predetermined time.

Although not shown in figures, two freezing units Y may be disposed parallel in a front-rear direction (in depth direction). And, similar to the embodiment of FIG. 3 and FIG. 4, the first communicative duct 72 and the second communicative duct 73 may be disposed, and the cold air flowing reverse control may be conducted by the fan controlling portion 8 for every predetermined time. That is to say, in the construction explained with FIG. 3 and FIG. 4, "one of the upper-lower freezing units Y" may be replaced with "one of the front-rear freezing units Y", and "the other of the upper-lower freezing units Y" may be replaced with "the other of the front-rear freezing units Y".

Figure 6:
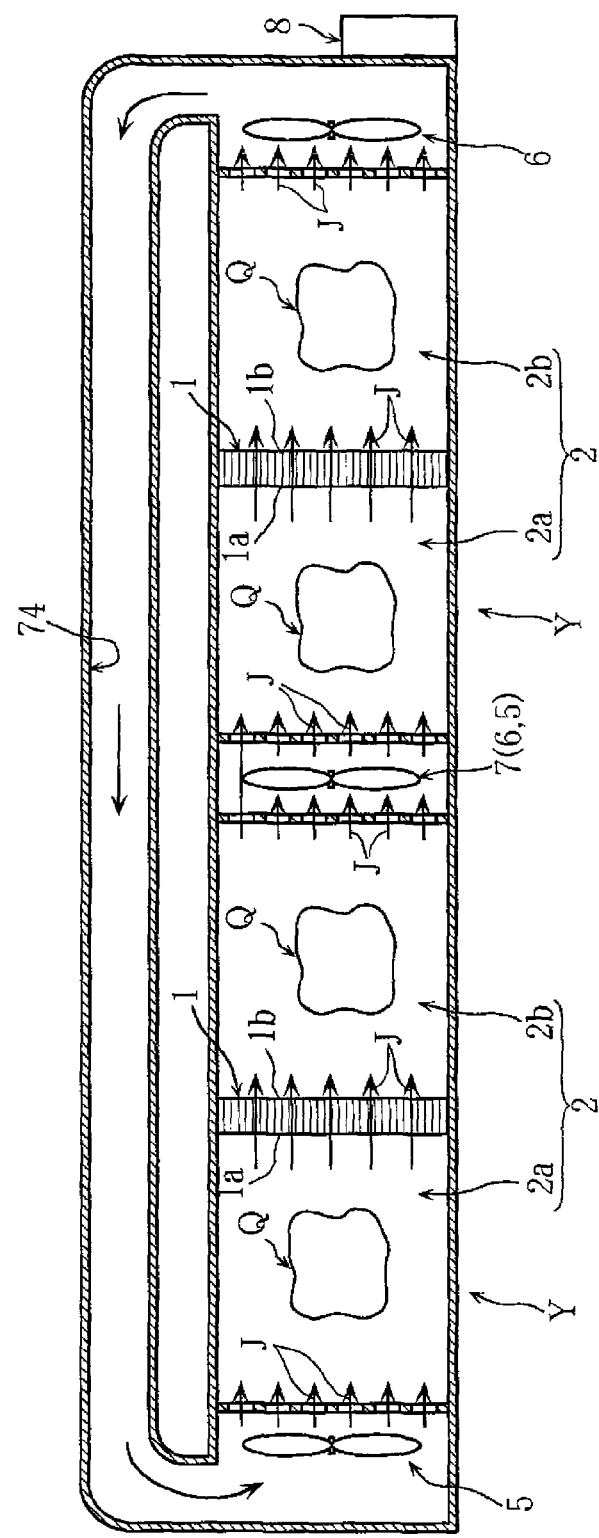
FIG. 6 A simplified cross-sectional front view showing a still another embodiment.
Figure 7:
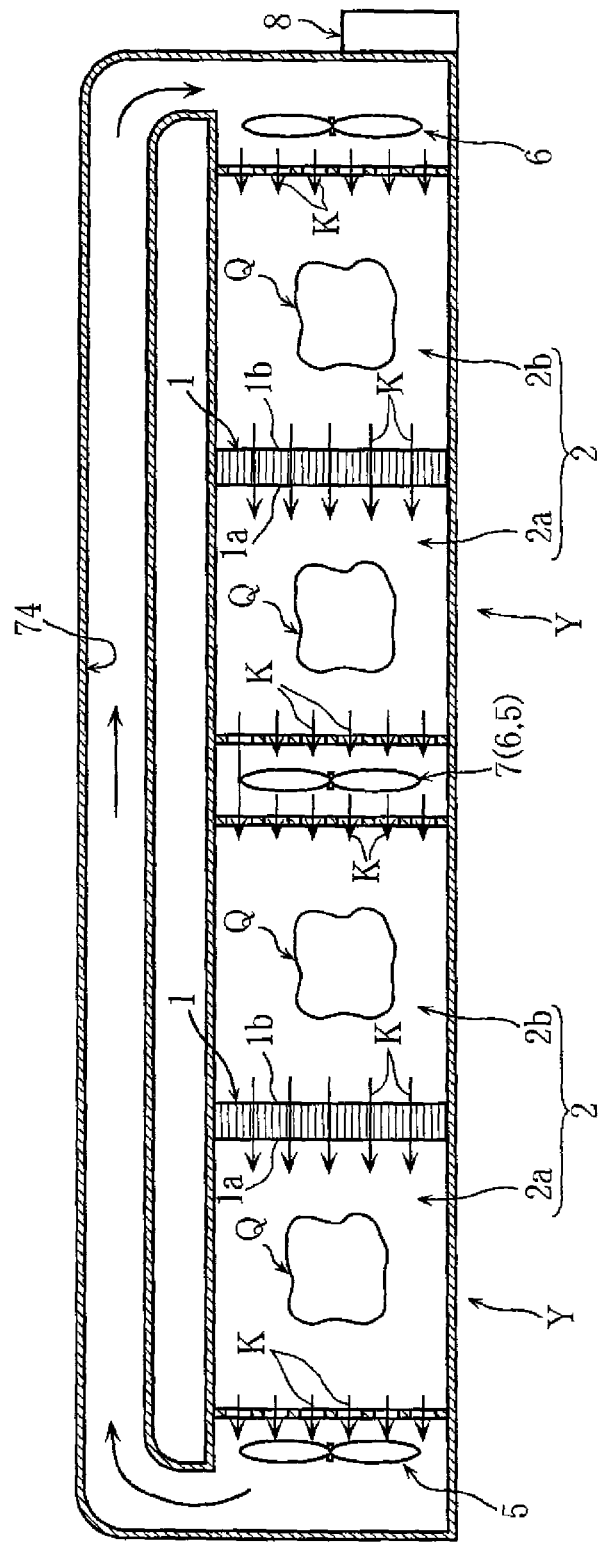
FIG. 7 A simplified cross-sectional front view to explain functions of the still another embodiment.

Next, in still another embodiment shown in FIG. 6 and FIG. 7, two above-described freezing units Y are disposed serial as to neighbor in a left-right direction. That is to say, one of the left-right freezing units Y and another of the left-right freezing units Y are provided.

And, a connecting duct 74 (a cold air circulation duct) is provided to connect the opposite side to the freezing block of the first blowing fan 5 of one of the left-right freezing units Y and the opposite side to the freezing block of the second blowing fan 6 of the other of the left-right freezing units Y.

And, the second blowing fan 6 of one of the left-right freezing units Y and the first blowing fan 5 of the other of the left-right freezing units Y are common (the same) as a common blowing fan 7.

As shown in FIG. 6, the fan controlling portion 8 conducts first left-right direction cold air generation control which controls fan rotating directions of the first blowing fan 5 on one of the left-right freezing units Y, the common blowing fan 7, and the second blowing fan 6 on the other of the left-right freezing units Y as to flow the cold air in the arrows J direction in one of the left-right freezing units Y (as to flow the cold air from the first freezing block 2a to the second freezing block 2b through the cooler 1), and as to flow the cold air in the arrows J direction in the other of the left-right freezing units Y (as to flow the cold air from the first freezing block 2a to the second freezing block 2b through the cooler 1).

And, as shown in FIG. 7, the fan controlling portion 8 conducts second left-right direction cold air generation control which controls fan rotating directions of the first blowing fan 5 on one of the left-right freezing units Y, the common blowing fan 7, and the second blowing fan 6 on the other of the left-right freezing units Y as to flow the cold air in the arrows K direction in the other of the left-right freezing units Y (as to flow the cold air from the second freezing block 2b to the first freezing block 2a through the cooler 1), and as to flow the cold air in the arrows K direction in one of the left-right freezing units Y (as to flow the cold air from the second freezing block 2b to the first freezing block 2a through the cooler 1).

And, the fan controlling portion 8 conducts the cold air flowing reverse control, which controls the fan rotational directions as to switch the above-described first left-right direction cold air generation control and the above-described second left-right direction cold air generation control (in turn) for every predetermined time.

And, the functional continuous rapid freezing apparatus of the present invention is, for example, provided with a door 21 corresponding to each of the freezing blocks as shown in FIG. 5 to put the article Q in and out of each of the freezing blocks. And, although not shown in figures, each of the freezing blocks is provided with a drawer member of basket type freely slidable in front-rear direction, in which the article Q to be frozen can be stored, or a freely slidable grate to make the rapid freezing apparatus batch type (system).

And, considering the size and configuration of the article Q, opposition cold air generation control, in which cold air is simultaneously blown in both directions (left-right directions) may be conducted to shorten the cooling (freezing) time by the fan controlling portion 8 controlling the rotational directions of the first and second blowing fans 5 and 6.

And, plural first blowing fans 5 corresponding to the first freezing block 2a may be provided to form a group of the first blowing fans 5, and plural second blowing fans 6 corresponding to the second freezing block 2b may be provided to form a group of the second blowing fans 6. And, some fans of the group of the first blowing fans 5 and some fans of the group of the second blowing fans 6 may be selectively driven by the fan controlling portion 8 to conduct various cold air generation controls such as upward cold air generation control, downward cold air generation control, turbulent cold air generation control, up-down inclining cold air generation control in front view, and front-rear inclining cold air generation control in top view. Not influenced by the configuration and size of the article Q, the cooling operation time may be shortened by surrounding the whole face of the article Q with generation of various air flows corresponding to the configuration and size of the article Q. And, the cold air flowing reverse control may be combined with the various cold air generation controls by the fan controlling portion 8 to conduct rapid freezing with predetermined order for every predetermined time.

And, the depth (front-rear direction) dimension of the freezing chamber 2 may be made larger and divided further in small lots to store the articles Q of various kinds and configurations in each of the freezing blocks 2a and 2b because the freezing chamber 2 is easily divided into small lots (blocks) like 2 blocks in FIG. 1 and FIG. 2 or 4 blocks in FIG. 3 and FIG. 4 by the cooler 1 placed on the central portion of the freezing chamber 2.

And, timers corresponding to the freezing blocks 2a and 2b may be provided, and on-off control of the fans may be conducted by cooperation of the timers and the fan controlling portion 8 because the operation time can be reverse calculated by the set temperature (cooling temperature), wind speed, and size (thickness) and kind of the article to be frozen.

Conventionally, setting of the cooling operation time depends on experience, and tends to be set long, and waste of time and refreezing reduce the efficiency. With the timer control, anyone (who has not rich experience in judging freeze) can freeze easily with good efficiency and appropriate time (for example, cooling operation time is 60 minutes for fillet of amberjack of which thickness is 60 mm when setting wind speed 3.5 m/sec. and temperature −40° C.), and further cost cutting effect can be obtained without waste.

Next, method of use (operation) of the functional continuous rapid freezing apparatus relating to the present invention is described.

In FIG. 1, the first blowing fan 5 and the second blowing fan 6 are driven by command signals from the fan controlling portion 8 to generate cold air flow in the arrows J direction horizontal in front-rear direction from the first freezing block 2a to the second freezing block 2b. After a predetermined time, the first blowing fan 5 and the second blowing fan 6 are made reverse rotate (the cold air flow reverse control is conducted) by command signals from the fan controlling portion 8 to generate cold air flow in the arrows K direction horizontal in front-rear direction from the second freezing block 2b to the first freezing block 2a as shown in FIG. 2. And, the cold air flow reverse control, which switches the direction of cold air flow (rotational direction of the fans) is conducted for every predetermined time, and cooling (freezing) is conducted for predetermined operation time.

The cold air is not partial (staying) on a part in the freezing chamber 2, the cold air blows on both of the left and right sides of the article Q, cooling progresses on the whole face of the article Q uniformly and rapidly, the temperature of the inner portion (central portion) of the article Q lowers as to rapidly pass the maximum ice crystal generating zone (in short time) and reaches for desired temperature easily in short time. That is to say, ice crystal in tissue cells does not grow large, and the tissue cells are frozen without breakdown.

And, one of the first blowing fan 5 and the second blowing fan 6 is made blow the cold air to the freezing blocks (positive pressure work) and the other of the first blowing fan 5 and the second blowing fan 6 is made suck the cold air from the freezing blocks (negative pressure work) to make the cold air flow in the freezing chamber 2 stably and conduct the circulation of the cold air efficiently.

And, frost may be generated and grown on the side of the cooler to which the cold air is blown. For example, in case of the cold air flow in the arrows J direction in FIG. 1, the cold air is blown to the face 1a side of the cooler 1 (receiving positive pressure wind), frost may be generated and grown large.

However, the direction of the cold air flow is made opposite after the predetermined time (the cold air flow is in the arrows K direction in FIG. 2), the frost on the face 1a side of the cooler 1 is removed (defrosted) by the sucking (negative pressure wind) of the first blowing fan 5. For example, in FIG. 1, the cooler 1 is in frost-generated state (frosted state) on the face 1a side and in defrosted state (frost-removing state or non-frost state) on the other face 1b side. When the cold air flow reverse control is conducted by the fan controlling portion 8, the cold air flow is as shown in FIG. 2, and the face 1a side becomes defrosted state (frost-removing state or non-frost state) and the other face 1b side becomes frost-generated state (frosted state).

That is to say, with the cold air flow reverse control conducted by the fan controlling portion 8 for every predetermined time, the face 1a side and the other face 1b side of the cooler 1 are defrosted in turn, the frost on the cooler 1 is removed (not grown), and reduction of cooling ability by the frost is prevented. The cooling (freezing) operation and frost-removing operation are simultaneously conducted to make continuous cooling (freezing) operation possible without temporary halt (for removing frost) of the freezing operation.

And, also in the embodiment in FIGS. 3 through 7, the above-described cooling function and frost-removing function can be obtained, and the article Q is frozen with good efficiency.

Figure 8:
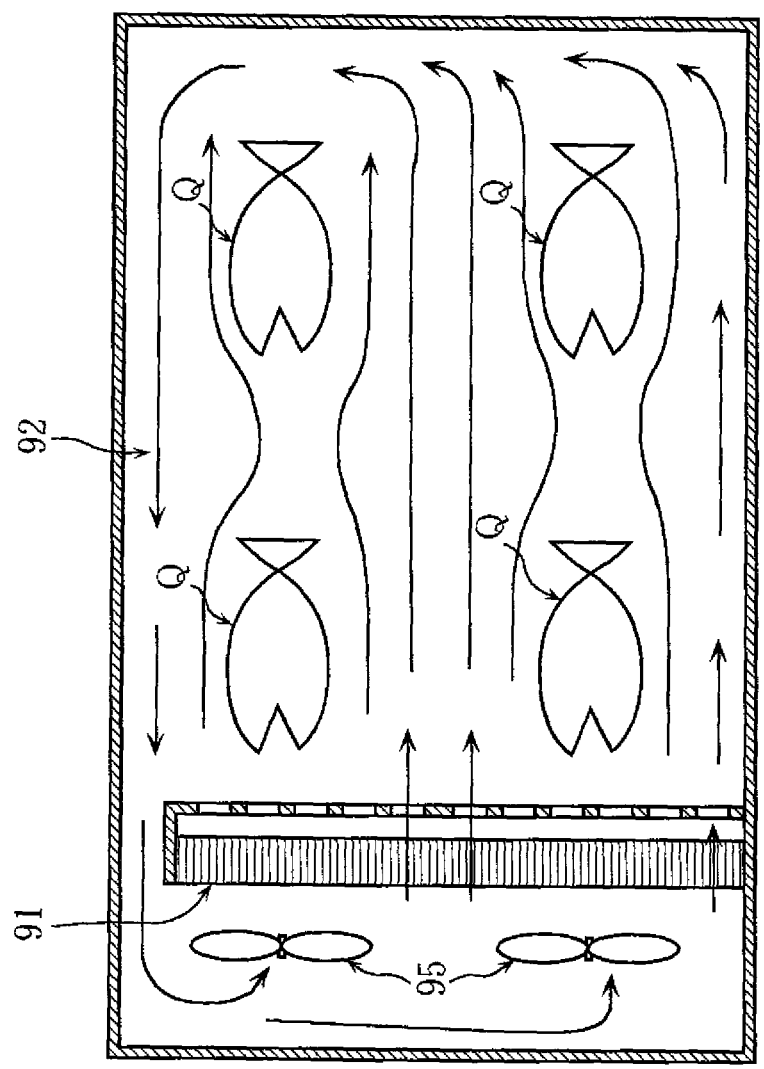
FIG. 8 A simplified cross-sectional front view showing a conventional example.

A sensuous test was conducted with the embodiment of FIG. 3 and FIG. 4 as an example and a conventional rapid freezing apparatus as shown in FIG. 8 as a comparison example.

As articles Q for the sensuous test, articles, which tend to generate problems to freezing and of which quality is easily judged by feel and taste, are chosen.

The articles Q (food, foodstuff), configurations and preliminary process before the tests, problems, which can be generated when frozen, are shown in table 1 below.

TABLE 1

| Article to be frozen (food, foodstuff) | Configuration/ Preliminary process | Problems |
|---|---|---|
| (I)Fillet of Amberjack | Thickness 60 mm 2.7 kg | Bloody color part becomes dark. Elasticity reduced and becomes too soft. |
| (II)Lobster with shell | Dipped in iced water, and frozen with suspended animation 500 g each | Elasticity lost and becomes soft and crumbly. Rather cloudy Becomes sparse. |
| (III)Bamboo sprout with sheath | 70 mm in diameter Frozen without boiling 1.2 kg each | Taste and flavor lost. Becomes dry. Becomes fibrous and uneatable. |
| (IV)Eggroll | Made by a famous shop 300 g each | Flavor and taste decline. Surface becomes dry. |

And, conventional rapid freezing apparatuses as shown in FIG. 7 of different makers were assigned as a comparison example A, a comparison example B, a comparison example C, and a comparison example D. And, the comparison examples A through D were operated to freeze the articles (I) to (IV) in the above table 1, then, the articles were preserved in a freezer of −25° C., and naturally thawed 1 month later for the sensuous test. The articles were evaluated in taste and feel by 5-stage evaluation from 1 to 5 points. Concretely, an article, with which the problems in table 1 are not solved at all and quality is greatly lowered, is evaluated with 1 point. And, an article, with which the problems in table 1 are not solved and quality is lowered, is evaluated with 2 points. And, an article, with which the problems in table 1 are not sufficiently solved and quality is rather lowered, is evaluated with 3 points. And, an article, with which the problems in table 1 are somewhat solved and quality is slightly lowered, is evaluated with 4 points. And, an article, with which the problems in table 1 are solved and quality is kept same as before the freezing, is evaluated with 5 points.

The results of the comparison examples A through D are shown in table 2. The conventional rapid freezing apparatuses (comparison examples) clearly can't solve the problems of quality degeneration.

TABLE 2

| | Conventional rapid freezing apparatus | | | |
|---|---|---|---|---|
| | Comparison Example A | Comparison Example B | Comparison Example C | Comparison Example D |
| | Set temperature | | | |
| | −35° C. | −40° C. | −45° C. | −55° C. |
| | Wind speed | | | |
| Article to be frozen | 3 m/sec. | 3 m/sec. | 3 m/sec. | 3 m/sec. |
| | Operation time | | | |
| (food, foodstuff) | 60 to 100 Min. | 60 to 100 Min. | 60 to 100 Min. | 60 to 100 Min. |
| (I)Fillet of Amberjack Taste | 2 | 2 | 2 | 3 |
| Feel | 2 | 2 | 2 | 3 |
| (II)Lobster with shell Taste | 3 | 3 | 3 | 3 |
| Feel | 2 | 2 | 2 | 2 |
| (III)Bamboo sprout with sheath Taste | 1 | 1 | 1 | 2 |
| Feel | 1 | 1 | 1 | 2 |
| (IV)Eggroll Taste | 2 | 2 | 2 | 3 |
| Feel | 2 | 2 | 2 | 2 |

Next, the results of the example are shown in table 3. In comparison with the conventional rapid freezing apparatuses (comparison examples), quality degeneration is clearly small.

It can be said that quality degeneration is reduced even in the articles Q to be frozen conventionally problematic in freezing by the position of the cooler 1, the disposition of the blowing fans 5 and 6, and the rotation control of the fans.

Although optimum cooling temperature is around −40° C. (−38° C. to −42° C.), the quality is sufficiently kept within the range of −35° C. to −55° C. And, although the quality is sufficiently kept and economical for small amount of electricity with wind speed around 3.5 m/sec. (3.0 m/sec. to 4.0 m/sec.), sufficient quality keeping is confirmed also at 2 m/sec. to 8 m/sec. And, cooling ability of the cooler 1 is hardly lowered by frost, and good efficiency is obtained. And, waste of time for defrosting can be reduced in operation of long time (more than 8 hours), and good efficiency is obtained.

TABLE 3

| | | Set temperature | |
|---|---|---|---|
| | | −40° C. | |
| | | Operation time | |
| | | 60 min. (changing the cold air flow for Every 15 min.) Wind speed 3.5 m/sec. | |
| Article to be frozen (food, foodstuff) | Evaluation item | Evaluation | Comments |
| (I)Fillet of Amberjack | Taste | 4 to 5 | Matching to chilled articles. Bloody color part remains red. Fresh fish taste |
| | Feel | 4 to 5 | |
| (II)Lobster with shell | Taste | 4 to 5 | Fine and elastic enough |
| | Feel | 4 to 5 | Juicy, elastic, and plump when boiled |
| (III)Bamboo sprout with sheath | Taste | 4 | Felt like freshly dug out when eaten raw 2 months later. Rather bitter when boiled but without particular problems. |
| | Feel | 4 | |
| (IV)Eggroll | Taste | 4 | Good taste keeping taste and feel just after the production. |
| | Feel | 4 | |

And, the articles Q to be frozen were grouped into fish, meat, vegetables, and processed foods, and sensuous test was conducted with the example.

10 specialists of tasting as monitors evaluated color (tinge), taste, flavor, and feel.

The articles were evaluated by 5-stage evaluation from 1 to 5 points. Concretely, an article, with which quality is greatly lowered, is evaluated with 1 point. And, an article, with which quality is clearly lowered, is evaluated with 2 points. And, an article, with which quality is rather lowered and felt like frozen food, is evaluated with 3 points. And, an article having quality slightly changed and can be sufficiently evaluated is evaluated with 4 points. And, an article, of which quality is kept high without change, is evaluated with 5 points.

And, the articles Q were stored to occupy a quarter of capacity of each of the freezing blocks. The fan controlling portion 8 is provided to switch the cold air flow for every 10 minutes.

And, the articles were preserved in a freezer of −25° C., and thawed after 2 months for the sensuous test. Fish and meat were thawed in a refrigerator of +2° C. to +3° C. Vegetables and processed foods were thawed by boiling, microwave oven, and natural thawing depending according to the kind.

First, the results of the sensuous test for fish are shown in table 4 below. As clearly shown in table 4, in case of (small) fish, it is clearly shown that the fish can be frozen with mostly same high quality in comparison with the fish before freezing in spite of shorter operation time than conventional operation time.

And, it is revealed that sufficient effect can be obtained with cooling temperature of −35° C. to −40° C. with consideration of cooling (freezing) operation cost. And, similar evaluations were obtained for fish not shown in table 4.

TABLE 4

| | Set temperature | | |
|---|---|---|---|
| | −35° C. | −40° C. | −45° C. |
| | Wind speed | | |
| | 3.5 m/sec. | 3.5 m/sec. | 3.5 m/sec. |
| | Operation time | | |
| Article to be frozen | 70 minutes | 50 minutes | 45 minutes |
| Spear squid (300 g each) | 5 | 5 | 5 |
| Saury (130 g each) | 4 | 4 | 5 |
| Mackerel (350 g each) | 4 | 4 | 5 |
| Rock oyster (400 g each) | 5 | 5 | 5 |

Next, the results of the sensuous test for meat are shown in table 5 below. As clearly shown in table 5, both of beef and pork are kept with the quality before freezing without drip. And, similarly high evaluation (quality) was obtained with wind speed and operation time other than that of table 5 below.

TABLE 5

| Article to be frozen | | Set temperature | | |
|---|---|---|---|---|
| | | −35° C. | −45° C. | −45° C. |
| | | | Wind speed | |
| | | 3 m/sec. | 3 m/sec. | 3 m/sec. |
| | | | Operation time | |
| | | 70 minutes | 60 minutes | 50 minutes |
| Beef (loin) | slice | 5 | 5 | 5 |
| | block | 5 | 5 | 5 |
| Pork | slice | 5 | 5 | 5 |
| | block | 4 | 5 | 5 |
| Chicken | white meat | 5 | 5 | 5 |
| | whole | 4 | 5 | 5 |

Next, the results of the sensuous test for vegetables are shown in table 6 below. As clearly shown in table 6, vegetables are hardly degenerated. Although table 6 below shows the results with blanching, in case that freezing raw vegetables (without blanching) and cooked in boiled water or naturally thawed, evaluation was 5 for all vegetables. Intrinsic sweetness and taste of the vegetables are enhanced and far better than the case in which blanching is conducted.

And, various vegetables not shown in table 6 were rapid-frozen with change of conditions such as wind speed, and mostly similar results were obtained except vegetables including much water (radishes and cucumbers, for example).

TABLE 6

| Article to be frozen | Blanching conditions | Set temperature | | |
|---|---|---|---|---|
| | | −35° C. | −40° C. | −55° C. |
| | | | Wind speed | |
| | | 4 m/sec. | 3 m/sec. | 2.5 m/sec. |
| | | | Operation time | |
| | | 60 minutes | 60 minutes | 60 minutes |
| Kidney beans | 100° C. 3 minutes | 4 | 4 | 5 |
| Spinach | 95° C. 45 seconds | 4 | 4 | 5 |
| Carrot | 90° C. 3 minutes | 4 | 4 | 5 |
| Green soybeans | 100° C. 6 minutes with 2% salt water | 4 | 4 | 5 |

Next, the results of the sensuous test for processed foods are shown in table 7 below. As clearly shown in table 7, the quality just after production is mostly kept. And, although not shown in table 7 below, for example, octopus balls, broad beans, fried bean curd, short cakes, rolled cakes, bread, cabbage rolls were rapid-frozen with change of conditions such as wind speed, operation time, and cooling temperature, and similar evaluation (quality) was obtained as shown in table 7.

And, some monitors reported that the frozen rice tastes better than unfrozen rice when used for dipping into green tea and for fried rice.

And, when the above-described sensuous tests were conducted with the embodiment of FIG. 1 and FIG. 2 and the embodiment of FIG. 6 and FIG. 7, similar results (qualities) were obtained.

TABLE 7

| Article to be frozen | Thawing method | Set temperature | | |
|---|---|---|---|---|
| | | −35° C. | −40° C. | −45° C. |
| | | | Wind speed | |
| | | 3 m/sec. | 3 m/sec. | 3 m/sec. |
| | | | Operation time | |
| | | 50 minutes | 50 minutes | 50 minutes |
| Hamburg | Boiling | 5 | 5 | 5 |
| Shao-mai | Microwave oven | 5 | 5 | 5 |
| Chikuwa | Natural thawing | 5 | 5 | 5 |
| Okonomiyaki | Microwave oven | 4 | 5 | 5 |
| Rice | Microwave oven | 5 | 5 | 5 |

And, the above-described results clearly show that sufficient quality can be obtained when the article Q is frozen with the cooling temperature of −35° C. to −55° C. and the wind speed of 2 m/sec. to 8 m/sec. And, the amount of wind is proportional with the wind speed and having no particular problem. And, the cold air flow uniformly contacts the article Q and mostly perfect rapid freezing of the article Q is conducted without quality degeneration. And, with the operation time, set to be shorter than that of conventional apparatuses considering cost, sufficiently good results are obtained.

In the present invention, which is modifiable, the return duct 71 may be in the freezing chamber 2 as the returning cold air, passing through the return duct 71, passes through the cooler 1 in FIG. 1 and FIG. 2. And, in FIG. 3 and FIG. 4, the cooler 1 may not be shared, and one of the freezing units Y and the other of the freezing units Y may be independently provided with one cooler.

As described above, the cold air flow is prevented from localizing on a part and true rapid freezing is possible because the functional continuous rapid freezing apparatus of the present invention is provided with the freezing chamber 2 in which the article Q to be frozen is stored, the heat exchanger 1 for cooling disposed on the central portion of the freezing chamber 2 as the partition to divide the freezing chamber 2 into the first freezing block 2a and the second freezing block 2b, the first blowing fan 5 disposed to face the heat exchanger 1 for cooling through the first freezing block 2a, and the second blowing fan 6 disposed to face the heat exchanger 1 for cooling through the second freezing block 2b. And, the cooling ability of the cooler 1 is sufficiently obtained at −35° C. to −40° C. (or −38° C. to −42° C.), and cost-reducing effect is obtained for the amount of electricity of ½. 5 (40%) to ½ (50%) in comparison with the conventional cooling at −55° C. (temperature lower than −50° C.). And, production cost and running cost can be reduced because generation of electric field and magnetic field is not necessary. The cold air flows uniformly on the whole face of the article Q to be frozen as to wrap the article, passing the maximum ice crystal generating zone within a short period of time, the central portion of the article Q to be frozen reaches for the predetermined temperature within a short period of time, and ideal rapid freezing can be conducted. Frozen processed articles of various foods and foodstuffs (frozen food) can be continuously operated for a long time with high quality and low cost. Quality degeneration by freezing can be reduced to the minimum. And, strong cold air flow uniformly contacts the article Q, freezing uniformly proceeds, the time that the central portion of the article Q to be frozen reaches for the predetermined temperature is ½ (50%) to ⅔ (67%) of the conventional apparatuses, ice crystal hardly grows, and high-quality frozen article can be produced.

And, effectively utilizing the positive and negative pressure (pressure difference) by the rotational directions of the first and second blowing fans 5 and 6 to control the amount of air and the flowing directions of the cold air, strong cold air flow uniformly contacts the article Q to uniformly proceed the freezing, the time that the central portion of the article Q to be frozen reaches for the predetermined temperature is short (rapid), ice crystal hardly grows, and high-quality frozen article can be produced because the fan controlling portion 8, which controls the fan rotating directions of the first blowing fan 5 and the second blowing fan 6 as to switch the cold air in the freezing chamber 2 generated by the heat exchanger 1 for cooling to the flowing from the first freezing block 2a to the second freezing block 2b and to the flowing from the second freezing block 2b to the first freezing block 2a for the predetermined time, is provided. And, with the change of the flowing direction of the cold air for predetermined time (every 10 to 15 minutes, for example), defrosting (frost removing work) is realized adding to effective contact of the cold air with the article Q, and efficient freezing operation is possible without reducing the ability of the cooler 1. The rapid freezing operation (process) and the defrosting operation (process) can be simultaneously conducted, continuous freezing operation longer than 15 to 24 hours is made possible without temporary halt (for removing frost) of cooling (freezing) operation. Reduction of freezing ability of the cooler 1 by frost and defect by overload on compressor can be prevented.

EXPLANATION OF THE MARKS

1 A heat exchanger for cooling
2 A freezing chamber
2*a* A first freezing block
2*b* A second freezing block
5 A first blowing fan
6 A second blowing fan
8 A fan controlling portion
Q An article to be frozen

The invention claimed is:

1. A functional continuous rapid freezing apparatus characterized by that a freezing chamber (2) in which an article (Q) to be frozen is stored, a heat exchanger (1) for cooling disposed on a central portion of the freezing chamber (2) as a partition to divide the freezing chamber (2) into a first freezing block (2a) and a second freezing block (2b), a first blowing fan (5) disposed to face the heat exchanger (1) for cooling through the first freezing block (2a), and a second blowing fan (6) disposed to face the heat exchanger (1) for cooling through the second freezing block (2b), are provided, wherein a fan controlling portion (8), which controls fan rotating directions of the first blowing fan (5) and the second blowing fan (6) as to switch cold air in the freezing chamber (2) generated by the heat exchanger (1) for cooling to a flowing from the first freezing block (2a) to the second freezing block (2b) and to a flowing from the second freezing block (2b) to the first freezing block (2a) for a predetermined time, is provided.

* * * * *